United States Patent Office 3,793,413
Patented Feb. 19, 1974

3,793,413
PROCESS FOR FORMING MICROPOROUS SHEET
Stanley I. Hayes, Jr., Hamilton, Mass., assignor to
USM Corporation, Boston, Mass.
Original application Apr. 8, 1970, Ser. No. 26,591.
Divided and this application May 11, 1972, Ser.
No. 252,491
Int. Cl. B29d 27/00
U.S. Cl. 264—41
11 Claims

ABSTRACT OF THE DISCLOSURE

Process of making microporous sheet having pores of controlled size and arrangement in which temperature and composition are coordinated to control growth of size of non-solvent liquid droplets constituting the discontinuous phase of an emulsion of which the continuous phase is a heated liquid polymeric reactive material which sets through reaction to solid condition and in which process the droplets are removed after setting of the reactive material to leave spaces constituting openings or pores in the solidified material. Pores of smaller size relative to the size of pores in the body of the sheet are provided in the sheet by control of the temperature of a casting surface.

FIELD OF USE, BACKGROUND AND PRIOR ART RELATIVE TO THE INVENTION

This is a division of application Ser. No. 26,591, filed Apr. 8, 1970, now Pat. No. 3,718,532.

This invention relates to an improved process for making a microporous body of controlled pore size and distribution.

In the U.S. patent application of John J. McGarr Ser. No. 867,986, filed Oct. 16, 1969 entitled "Improved Process for Forming a Thin Microporous Sheet Material," now U.S. Pat. 3,679,783, issued July 25, 1972, there is disclosed a process in which an emulsion is formed in which the discontinuous phase is droplets of a nonsolvent liquid and the continuous phase is a reactive polymeric material convertible through reaction to a tough, solid, resilient film-forming condition. The emulsion is formed into a body of desired shape and reacted to solidify the reacted material with the droplets of nonsolvent liquid entrapped in the solidified body and the nonsolvent liquid of the droplets is removed from the solidified body leaving spaces constituting openings or pores.

In the process of that application producing successive batches of the same porosity required very careful control of emulsion forming conditions so that the nonsolvent liquid droplets at the time of casting had a controlled size which determined the pore size of the solidified material.

It is an object of the present invention to provide a process for forming a microporous body in which controlled pore size is readily obtainable.

It has also been observed in the testing and use of microporous materials that relatively fine pore size may be desirable in certain portions of a sheet material particularly in a thickness zone extending in from a surface both for purposes of giving improved finishing characteristics and for resisting the special stresses encountered at a surface, while somewhat larger pore size may be desirable in the body of a sheet of material.

It is a further object of the present invention to provide a process in which different pore sizes may be obtainable in different thickness portions of the solidified material and to provide a new microporous material having such controlled variations in pore size.

SUMMARY OF THE INVENTION

I have found that, in an emulsion of which the liquid continuous phase is based on a polymeric material reactive to solid resilient condition and the disperse phase is nonsolvent liquid droplets, the composition and conditions of the emulsion may be controlled to enable the droplets to start to grow when agitation to emulsify has been completed and the droplets continue growing until solidification of the reactive material. Conditions which control this growth of droplet size include temperature, viscosity and surface active agent addition.

I have also found that by providing a casting surface at a temperature lower than the temperature of the reactive emulsion at the time of casting, the growth of droplet size adjacent such surface will be less than the droplet growth in the body of the emulsion so that a body, such as a sheet, having finer pores at a surface and coarser pores in the body may be formed.

BRIEF DESCRIPTION OF THE DRAWING

Reference is made to the attached drawings forming part of the disclosure of the present case in which.

DESCRIPTION OF THE PREFERRED EMBODIMENTS

Pores or passageways in a body of resilient polymeric material in the present process are secured by solidifying a reactive emulsion in which the dispersed phase is droplets of nonsolvent liquid and the liquid continuous phase comprises reactive polymeric material, and removing the nonsolvent liquid from the solidified continuous phase leaving the spaces previously occupied by the nonsolvent liquid as pores and passageways.

Reactive emulsions for use in the present process are similar to the formulae used in the earlier filed patent application of McGarr, referred to above; but are compounded to coordinate viscosity and emulsion instability. When the emulsion is cast in contact with a surface having a temperature different from the emulsion there is formed, after solidification and removal of nonsolvent liquid, a product in which the pores at the surface are of different size than the size of the pores in portions of the solidified body spaced from the casting surface.

Figure 1:
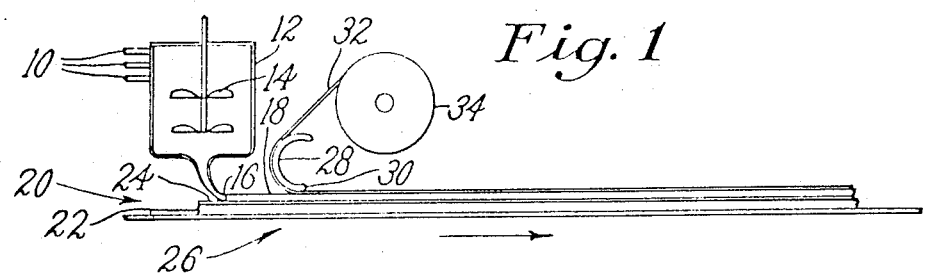
FIG 1 is a diagrammatic elevational view of an arrangement of apparatus suitable for practicing the invention.

Referring to FIG. 1, polymeric reactants and nonsolvent organic liquid to be mixed and emulsified are introduced through inlets 10 into the high speed mixer emulsifier 12 where they are acted on by the agitating blades 14. The resulting emulsion is discharged through orifice 16 and deposited as a layer 18 on the casting surface 20.

In the form shown the casting surface 20 includes a relatively thick plate member 22 with a release coating, film or sheet 24 on its surface. The casting surface is moved suitably on conveyor 26 beneath the orifice 16 which deposits the emulsion on successive portions of the surface.

Leveling of the deposited emulsion to a layer of uniform thickness is effected by moving the casting surface 20 and deposited emulsion layer 18 beneath a doctor member 28 shown as a curved member with its lower portion 30 spaced from the casting surface 20 a distance determined by the desired thickness of the emulsion layer 18.

Desirably a flexible cover sheet 32 is laid down on the emulsion layer. This may be done by feeding the cover sheet 32 from the roll 34 around the doctor member 28 where the cover sheet 32 serves as the working surface of the doctor member 28 in leveling the deposited emulsion to give a uniform layer 18.

Figure 2:
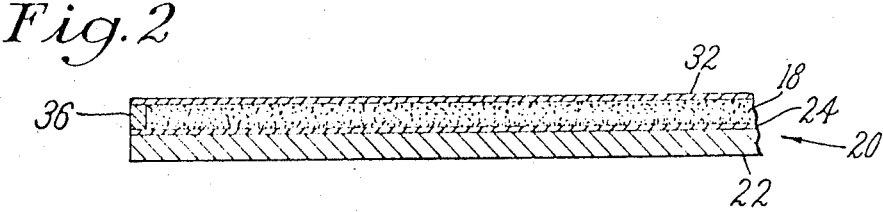
FIG. 2 is a fragmentary sectional elevational view of a cast layer with casting surface and cover sheet as may be formed on the apparatus of FIG. 1.

The casting surface 20, emulsion layer 18 and cover sheet 32 will then be in the relation shown in FIG. 2 with the edge portion of the deposited liquid layer 18 formed by an edge strip 36 carried by the casting surface 20.

Reactive materials for use in the solidifiable continuous phase are those for forming elastomeric polyurethane or polyurea reaction products both of which are hereafter referred to as polyurethanes and are selected on the basis of their ability to provide toughness, flexibility, hardness and other physical properties require in the final product. The reactive material may be a "one shot" mixture of an organic compound having at least two active hydrogens such as a polymeric polyol, e.g., polyalkylene ether polyol and/or polyester polyol with a reactive compound having at least two reactive —NCO groups, e.g., a polyisocyanate. Alternatively, there may be used a prepolymer system in which an —NCO terminated reaction product of a polyol with excess polyisocyanate is combined with chain extenders which may be polyhydroxy or polyamine or amino alcohol compounds having at least two hydroxyl or amine groups providing active hydrogens for reaction with —NCO groups.

It has been found desirable to use polyol material or prepolymers which at room temperature are solid or pasty. The term "pasty" refers to consistency which may be very high viscosity or may be partially solid which is capable of permanent deformation or even flow under substantial pressure, but which does not allow rapid, effective intimate mixing with other reagents and with the non-solvent liquid component to form a free flowing liquid emulsion with ordinary mixing and emulsifying equipment such as a high shear propeller type mixer.

Polyols useful in the "one shot" mixture or for forming the reactive prepolymer include substantially linear or only moderately branched polyether polyols, and substantially linear or moderately branched polyester polyols from the condensation of polybasic acids, e.g., adipic acid, sebacic acid, azelaic acid, dimerized linoleic acid and other aliphatic and aromatic dibasic acids with polyols such as butane diol, ethylene glycol, propylene glycol and the like. Castor oil is also a suitable polyol for making a prepolymer. Controlled portions of polyols or polybasic acids having more than two reactive OH or —COOH groups may be included in the compositions reactive to form polyester polyols to introduce moderate branching or cross linking.

The reaction of the nonsolvent pore-forming liquid is primarily physical, that is, the nonsolvent liquid is a readily removable space filler which is present as dispersed droplets until the coating at least partially solidifies around the droplets and is removed thereafter leaving open spaces and pores. Removal is effected without expansion of the solidified body. Suitable liquids may readily be selected by a chemist on the basis of the known physical properties of liquids. Any liquid having substantial non-solvency and non-reactivity with the polymeric material together with suitable volatility characteristics may be used. Normally liquid aliphatic hydrocarbons including petroleum hydrocarbon fractions, particularly those commercially available as mineral spirits, petroleum naphtha and kerosene which are largely or completely aliphatic in composition are generally preferred because of their low cost and satisfactory behavior in the composition; but other substantially inert organic liquids such as liquid alkyl ethers, e.g., amyl ether and dibutyl ether and liquid halogenated hydrocarbons, preferably halogenated aliphtatic hydrocarbons such as chlorodecane, tetrachloroethylene and tetrachlorodifluoroethane may be used. To avoid premature evaporation from the body of emulsion so that it can serve its space filling function until it has solidified, the pore-forming liquid is chosen to have a boiling point above the selected mixing and reaction temperatures and should preferably have a boiling point of at least about 100° C. and preferably at least 130° C. to allow use of temperatures giving a desirable fluidity and rate of reaction of the polymeric material. On the other hand the liquid will be chosen with low enough boiling point for removal without heat injury to the solidified body or to a base with which it may be associated. Thus the liquid should ordinarily not contain substantial quantities of high boiling or low volatility components, and preferably at least 90% of the components should boil at temperatures below 232° C. It is to be understood that other means than evaporation, e.g., extraction may be used to remove high boiling or low volatility liquid and in such cases the upper limit of boiling point does not apply.

The extent of heating of the reactive polymeric material needed to bring the material to a suitably low viscosity, which may be of the order of 6000 centipoises, for emulsion forming depends on the properties of the material. Higher melting point and higher molecular weight reactive polymeric materials require higher temperatures. Polymeric materials giving the desired improvement in retention of uniform droplet distribution of the emulsion in layer form call for heating to a temperature of at least about 50° C.

Dispersion of droplets of the pore-forming liquid in the heated liquid body of reactive polymeric material to form an emulsion in which the reactive polymeric material is the continuous phase, is effected by vigorous agitation during the course of addition of the pore-forming liquid to the body of polymeric material. Surface active agents are useful to aid in dispersing the liquid in the polymeric material and to control the stability of the resulting emulsion. Preferred emulsifying agents have included anionic and non-ionic surface active agents such as commercially available silicone emulsifiers, polyoxyalkylene ethers such as a commercial polypropoxy/polyethoxy ether, partial long chain fatty acid esters and the polyoxyalkylene derivatives of such esters, also sulfuric acid esters of long chain fatty alcohols, etc.

The amount of pore-forming liquid dispersed will vary with the desired porosity of the final product and may vary from as low as 25 parts of the liquid to 100 parts of the polymer up to as high as 300 parts of the liquid to 100 parts of the polymer material. It is preferred to use from about 60 parts to about 200 parts of liquid to 100 parts of the polymeric material. It is desirable that the mechanical conditions of dispersion of the liquid and the polymer be controlled to form very small droplet sizes of which the majority will be in the range of from about 0.0001 mm. to about 0.03 mm. in diameter.

Reaction of the polymeric material to higher molecular weight solid condition is brought about and controlled by the time and temperature conditions of bringing together of the reactive components and/or by the introduction of catalyst. In the one step process in which a polymeric polyol such as the polyether polyol or polyester polyol is reacted with a polyisocyanate, mixing and emulsification involves bringing together these materials together with the liquid to be dispersed and a catalyst, such as stannous octoate or lead naphthenate, effective to control the reaction rate. It will be understood that where the reaction occurs at so fast a rate that it is difficult to complete the emulsion before excessive increase in viscosity or solidification of the polymeric material takes place, the pore forming liquid may be emulsified in one of the reagents usually the polyether or polyester polyol before combination with the polyisocyanate.

In the two step process, an —NCO terminated prepolymer prepared from a polymeric polyol such as a hydroxyl terminated polyether or polyester and a polyisocyanate, the pore forming liquid, and chain extenders reactive with the prepolymer to give higher molecular weight materials are combined and emulsified with the prepolymer material forming the continuous phase. Chain extenders effective to increase the molecular weight of the prepolymer are compounds having two or more active hydrogen atoms such as p,p'-methylenedianiline, 4,4'-methylene-bis-(2-chloroaniline), trimethylolpropane, m-phenyldiamine, 1,4 butane diol and trimethanolamine.

The reactive emulsion employed in the present invention is prepared and compounded to insure the liquid droplets of the dispersed phase grow in size through merger of droplets during the time that the continuous phase remains liquid. The growth of droplets is affected by any agent having an influence on the surface tension between droplets or on the viscosity of the continuous phase. Included among such agents are solvents, temperatures and surfactants.

Addition to the reactive emulsion of an organic liquid which is a true solvent for the reactive materials of the continuous phase will reduce the viscosity of the continuous phase and increase the rate of growth of droplet size. The solvent also has a secondary action in slowing down the rate at which the reactive materials combine chemically to form a solid material and thus allows a longer time for increase in droplet size. Ordinarily up to about 20% by weight, and preferably from about 1% to about 7% by weight of true solvent based on the weight of the reactants may be used. Higher percentages of true solvent give a somewhat swollen product which shrinks in size when the solvent evaporates.

In addition to the viscosity reducing effect of solvents, some solvents have been found to reduce the stability of the emulsion, that is, to increase the growth rate of the size of droplets of nonsolvent liquid at a rate which may be substantially greater than is accounted for by simple viscosity reduction. The effect is readily determinable, but as of assistance in practicing the invention the following table lists solvents and solvent blends in order of their effect in decreasing the stability of a reactive emulsion system of the type under consideration.

Ethyl acetate=methylene chloride [1]
Toluol=ethyl acetate [1]
Dioxane
Acetone=toluol [1]
Methyl ethyl ketone=toluol [1]
Tetrahydrofuran=toluol [1]
Ethylene glycol monoethyl ether acetate
Toluol=ethyl acetate [1]
Ethyl acetate
Methyl ethyl ketone=ethyl acetate [1]
Methyl cellulose
Acetate=ethyl acetate [1]
Cyclohexanone
Tetrahydrofuran
Dimethylformamide
Methyl ethyl ketone
Acetone

[1] Equal parts by weight.

Stability of the emulsion is markedly affected by the surface active agents, i.e. surfactants present in the emulsion. The theory involved in selecting surfactants is not easily explained; but it is known that certain surface active materials aid formation of the emulsion of nonsolvent liquid in the reactive continuous phase and enhance the stability of the resulting emulsion while other surface active materials are known to reduce the stability of the emulsions. A parallel problem in selecting surface active materials for aqueous emulsions is discussed in the book "Emulsions: Theory and Practice," by Paul Becker, 2nd ed., p. 232 et seq. As there discussed emulsifiers can be rated according to their so-called hydrophile-lipophile balance and a "condition of maximum stability" will exist for a particular numerical value of that balance. Since the present system is nonaqueous the terms "hydrophile" and "lipophile" are perhaps not directly applicable. But the principle of operation, namely, determining a balance of surfactants providing maximum stability and then altering that balance in the direction of instability to increase the rate of merger of the droplets of nonsolvent liquid is a useful guide. Balancing the relative amounts of surfactant emulsion stabilizer and surfactant emulsion instabilizer to secure a desired instability of the emulsion to give a desired rate of merger of droplets of nonsolvent liquid in terms of rate of droplet size growth is a matter readily determined by testing by the skilled chemist.

Increase in temperature of the emulsion reduces the viscosity of the emulsion particularly where the reactive material is normally solid or highly viscous liquid and this viscosity reduction increases the rate of growth of non-solvent liquid droplets. However, increasing the temperature of the emulsion has an opposing secondary action in that it accelerates the rate of viscosity increase through increased rate of reaction of the components of the continuous phase and also shortens the overall time during which the continuous phase is sufficiently mobile to permit growth of droplet size.

In practice a preferred reaction temperature ordinarily is determined from known melting point stability, viscosity and reaction characteristics of the components of the reactive mixture, an emulsion of nonsolvent liquid droplets in the reactive material is formed at this temperature and trial sheet is made. To increase the pore size in the body of the sheet over the pore size of the trial sheet, the surfactant may be varied to increase instability to induce faster growth of droplet size, and/or an amount of true solvent may be incorporated in the reactive emulsion such that the effect of dilution in increasing the time required for reaction and the viscosity reducing effect of the solvent gives a desired droplet size growth.

The viscosity of the emulsion at the time of casting is not readily measured directly. However, in the present process, the emulsion is ordinarily cast promptly after formation and before reaction of the components of the continuous phase has increased the viscosity greatly. Accordingly, the viscosity of the original reactants provides a reasonable measure of the viscosity of the emulsion at the time of casting. Using this measure, it has been found that cell growth of the desired character occurs when the viscosity of the reaction mixture at the casting temperature is between 100 and 4000 centipoises and preferably below 2000 centipoises. At higher viscosities cell growth is too slow to be useful in the process.

To secure a solidified product in which the pore size at a surface is finer than the pore size in the body of the solidified material, the emulsion of droplets of nonsolvent liquid in the continuous phase of reactive material is cast on a casting surface having a temperature lower than the temperature of the emulsion. This result is something different from the effect of temperature on droplet size discussed above where it was noted that the viscosity reduction through use of higher temperature giving higher droplet size growth rate is offset by the speed up in chemical reaction which reduces the time during which the droplets can grow in size. Observable differences between pore size adjacent the surface and pore size in portions spaced from that surface have been obtained with as little as 5° C. difference in temperature between the temperature of the emulsion and the temperature of the casting surface, but ordinarily from about 15° C. to about 50° C. difference is desirable. Fine cells may have an average diameter of the order of 1 to 20 microns while the coarser cells may have an average diameter of the order of 30 to 90 microns or more.

Figure 3:
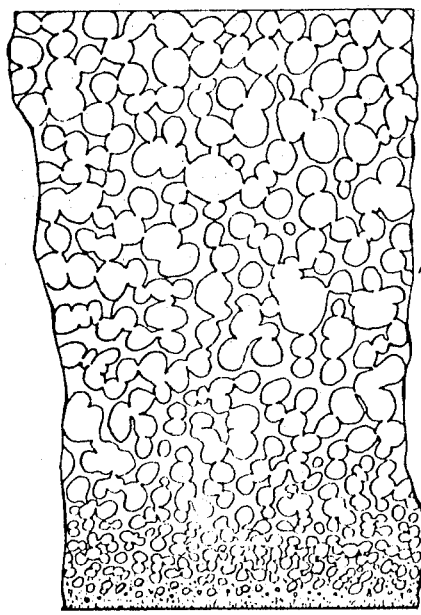
FIG. 3 is a fragmentary sectional view on a greatly enlarged scale of one form of microporous sheet according to the present invention.
Figure 4:
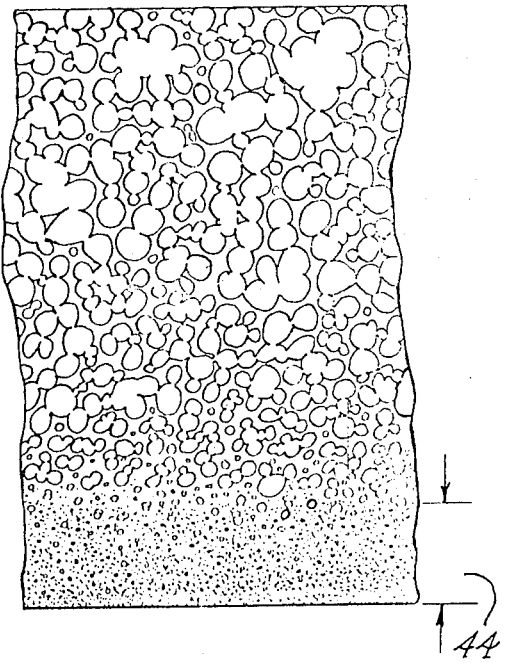
FIG. 4 is a fragmentary sectional view on a greatly enlarged scale of a second form of microporous sheet according to the present invention.

It has also been found that the heat conductivity of the surface against which the reactive emulsion is cast has an effect on the distribution of pore size extending in from the casting surface. With a casting surface of poor heat conductive material such as a fibrous, e.g. cellulosic sheet material there is formed a microporous sheet 38 (see FIG. 3) with a thin zone 40 of fine pored cellular material at the surface with the remainder coarser pored cellular material. The zone of fine porous material may be from about 0.001 inch or less down to a layer only 2 or 3 fine cell diameters in thickness. Where a higher heat conductivity casting surface such as a metallic casting surface having a thin release coating film or sheet of low insulating value on its surface is used, a microporous sheet 42 (see FIG. 4) is formed having a zone 44 of fine pore cellular structure extending a substantial depth in from the surface, e.g. from about 0.002 to about 0.04 inch.

Protective cover 32 (see FIG. 1) laid down on the surface of the deposited emulsion layer 18 opposite the casting surface 20 as the layer is formed, or promptly after it is formed gives improved cell uniformity at that surface. The cover may be a release sheet such as a paper sheet carrying a nonadhesive deposit for example, of silicone, polytetrafluoroethylene, polychlorotrifluoro ethylene, wax, polyethylene or polypropylene or may be a nonadhesive supported or unsupported resin or elastomer sheet. It appears that at least some of the advantages obtainable from a cover sheet are obtainable by covering the free surface of a cast body of emulsion with a layer of nonsolvent liquid which may be the same liquid as that dispersed through the emulsion or may be another immiscible, insoluble, nonreactive liquid.

The protective cover used in the manufacture of sheets is preferably flexible for convenience in handling and may be laid down on the emulsion layer by hand or by any of the known devices for laying a sheet down smoothly on a surface.

With the cover in place, the reaction of the polymeric progresses to gel and solidify the emulsion to a state in which the droplets of nonsolvent liquid are held in a solid matrix.

The protective cover 32 may be removed from the layer 18 when the layer has become a stable solid even before the reaction of the components of the mixture is complete and thereafter the nonsolvent liquid is removed, preferably by evaporation although it may be removed by liquid extraction if desired. The layer so obtained is substantially uniform and is porous from surface to surface. That is, the layer does not have the nonporous surface layer obtained when the cover is not used.

The mechanism by which the cover gives this improvement is not fully understood. The cover does not serve as an envelope to retain expansion gas since there is neither development of gas nor expansion of the layer.

It is believed that the cover acts to control surface conditions to prevent loss of nonsolvent liquid which might occur by syneresis or otherwise from portions of the layer adjacent the surfaces. An even more important factor appears to be the ability of the reactive polymeric material continuous phase to wet the cover preferentially to the nonsolvent liquid so that the polymeric material is continuous adjacent the cover and the droplets of nonsolvent liquid are aligned adjacent the surface but spaced from it by the continuous phase material. Surprisingly, the continuous phase opens at the points of closest approach of the droplets to the cover in the course of solidification so that excellent permeability at the surface is obtained without a tearing or cracking of the surface layer.

The following examples are given to aid in understanding the invention but it is to be understood that the invention should not be restricted to the materials, proportions or procedure of the examples.

EXAMPLE I 130 grams (0.0844 mol) of —NCO terminated prepolymer prepared by reaction of p,p'-diphenyl methane diisocyanate and hydroxyl terminated polybutylene adipate in a mol ratio of 2:1, resulting prepolymer having molecular weight of 1540, and being solid at room temperature was liquefied and degassed at 100° C. and mixed with 3.9 grams of an emulsifier defined as blended polypropoxy/polyethoxy ether having a hydroxyl number of 20 which is a solid at 25° C. and the mixture was brought to a temperature of 110° C. 148 cc. of a liquid, paraffinic hydrocarbon mixture (boiling range 346° F. to 405° F.) was added slowly to the heated mixture of polybutylene adipate and the emulsifier with vigorous agitation to form an emulsion with the hydrocarbon as the internal phase. 7.75 grams (0.0860 mol) of 1,4 butane diol, about 7 grams of methyl isobutyl ketone and about 0.26 gram of an organosilicone block copolymer surfactant were added and mixed in. The resulting reactive emulsion was at a temperature of 110° C. and was cast as layers about 0.080 inch in thickness on a series of casting surfaces, the cast layer being covered directly as it was formed with a release paper sheet. The casting surfaces were respectively, (A) an aluminum plate coated with a commercial urethane release agent, (B) an aluminum plate covered with a release paper sheet, and (C) a 3/16 inch thick sheet of cellulosic hardboard (Masonite) of which the surface was covered with release paper. In each instance the casting surface had been held in an oven at 60° C. to stabilize its temperature at 60° C.

The cast sheets were held overnight at a temperature of 60° C. and the cover sheets were stripped off. The sheets were then separated from the casting surfaces and held in an oven at 90° C. for 24 hours to complete the cure of the urethane and evaporate the paraffinic hydrocarbon and the methyl isobutyl ketone from the resulting sheets.

The resulting sheets were strong flexible microporous sheet materials. The sheets were cut and the cross section of the sheets was examined. Sheet A which had been cast on an aluminum plate coated with a release agent had a layer approximately 30 mils in thickness in which the pore size was from about 1 to about 5 microns and the remainder of the thickness of the sheet had a pore size of from 40 to 60 microns. Both sheet B and sheet C had a layer approximately 1 mil thick at the surface adjacent the casting surface in which the pores were very fine having a size in the range of from about 1 to about 5 microns. The cell size increased progressively from this fine pored surface portion reaching a cell size of about 60 to 80 microns at a distance of 60 mils from the casting surface.

EXAMPLE II

The procedure of Example I was repeated using an emulsion temperature of 100° C. rather than 110° C. As in Example I, sheet A had a relatively thick, i.e. about 30 mil, layer adjacent the casting surface, i.e. about 30 mil thickness of material in which the pore size was from about 1 to about 5 microns. The balance of the cells in the sheet were somewhat smaller with 40 microns being the cell size adjacent the portion furthest from the casting surface. Sheets B and C had in each case a very thin, approximately 1 mil thick, layer of fine cells at the surface adjacent the casting surface and in these sheets also the cell size only reached about 40 microns in portions spaced from the casting surface.

Having thus described my invention what I claim as new and desire to secure by Letters Patent of the United States is:

1. The process of forming a microporous sheet with a zone extending in from a surface having finer pores than the central portions of the thickness of the sheet comprising the steps of forming on release casting surface a layer of water free liquid emulsion of fine droplets of a volatile organic liquid as the internal phase in a continuous phase comprising liquid reactive mixture convertible through reaction to a solid resilient reaction product, said reactive mixture comprising as reactive components (A) an organic reactant provided at least two reactive —NCO groups per molecule and (B) an organic reactant having at least two active hydrogens per molecule for reaction with said —NCO groups, said volatile organic liquid of the internal phase having a boiling point of at least 100° C. and at least 90% boiling below 232° C., being substantially nonsolvent for and nonreactive with said reactive mixture, being substantially immiscible in said continuous phase and being present in amount of from about 60% to about 300% by weight based on the weight of the reactive mixture, the temperature, and reactive components of said emulsion being selected and coordinated to give an emulsion having a degree of instability such that at the end of agitation used to form the emulsion, fine droplets of said volatile immiscible liquid progressively merge together to form larger droplets within the body of emulsion during the period between forming of the layer on the casting surface and thickening of the continuous phase by reaction of said reactive components to a point where said droplets of volatile immiscible liquid are held in place, said reactive mixture being at a temperature below the boiling point of said volatile organic liquid when deposited on said casting surface and said casting surface being at a temperature from about 5° C. to about 50° C. below the temperature of said reactive mixture, reacting said mixture at a temperature below the boiling point of said nonsolvent liquid of the internal phase to cause the emulsion to gel without substantial expansion and with droplets of said nonsolvent liquid held in the solidified material, and removing the volatile organic liquid substantially without expanding the solidified material leaving pores and discontinuities in the solidified material to constitute passageways for air and vapor.

2. The process for forming a microporous sheet as defined in claim 1 in which the continuous phase including the mixture of said reactive components has a viscosity of from about 100 to about 4000 cps. when said emulsion is formed as a layer on said casting surface.

3. The process for forming a microporous sheet as defined in claim 2 in which the emulsion includes a surface active agent to stabilize the emulsion only to the extent that in thickness zones away from the cooling action of said casting surface, the droplets will merge to form droplets of at least about 30 microns when the continuous phase of the emulsion thickens.

4. The process for forming a microporous sheet as defined in claim 3 in which at least one of said reactive components is polymeric and is solid or pasty at room temperature, in which any of said reactive component which is solid or pasty at room temperature is heated to bring it to a fluid state and in which said reactive components are mixed, said non-solvent liquid is dispersed to form an emulsion and said emulsion is formed as a layer on said casting surface while said solid or pasty at room temperature component is in heated state.

5. The process for forming a microporous sheet as defined in claim 4 in which a volatile organic true solvent for a reactive component is included in the reaction mixture, said true solvent being nonreactive with said reactive components and the amount and character of surface active agent and solvent being coordinated to control the rate of reaction and rate of merger of said droplets to give desired average droplet size at the time when the continuous phase of the emulsion becomes too viscous for further merger of droplets.

6. The process for forming a microporous sheet as defined in claim 5 in which the thickness of said zone of finer pores is controlled by the effective heat conductivity of said casting surface.

7. The process for forming a microporous sheet as defined in claim 6 in which said casting surface is a heat conductive metal carrying a thin heat conductive release layer on its surface whereby a relatively thick zone of fine pores is obtained.

8. The process for forming a microporous sheet as defined in claim 6 in which said casting surface is a material of low heat conductivity relative to the conductivity of metal whereby a relatively thin zone of finer pores is obtained.

9. The process for forming a microporous sheet as defined in claim 2 in which means are provided to prevent loss of nonsolvent liquid from said emulsion on the face of said layer of emulsion opposite said casting surface before substantial reaction of said reactive components.

10. The process for forming a microporous sheet as defined in claim 4 in which a flexible impervious cover to prevent loss of nonsolvent liquid from said emulsion is provided on the face of said layer of emulsion opposite said casting surface before substantial reaction of said reactive components.

11. The process for forming a microporous sheet as defined in claim 5 in which said reactant having —NCO groups is an —NCO terminated reaction product of at least one member of the group consisting of polyester polyols and polyether polyols with a polyisocyanate and is solid or pasty at room temperature and in which a flexible impervious cover is provided to prevent loss of said nonsolvent liquid and said organic true solvent, said impervious cover being disposed on the face of said layer of emulsion opposite said casting surface before substantial reaction of said reactive components.

References Cited
UNITED STATES PATENTS

| | | | |
|---|---|---|---|
| 3,539,388 | 11/1970 | Tu | 264—41 |
| 3,539,389 | 11/1970 | Tu | 264—41 |
| 3,679,783 | 7/1972 | McGarr | 264—41 |
| 3,718,532 | 2/1973 | Hayes, Jr. | 264—41 |

DONALD E. CZAJA, Primary Examiner

M. I. MARQUIS, Assistant Examiner

U.S. Cl. X.R.

260—2.5 AY; 264—53

UNITED STATES PATENT OFFICE
CERTIFICATE OF CORRECTION

Patent No. 3,793,413   Dated February 19, 1974

Inventor(s) STANLEY I. HAYES

It is certified that error appears in the above-identified patent and that said Letters Patent are hereby corrected as shown below:

Column 10, Claim 7, line 19, "fine" should read -- finer -- .

Signed and sealed this 6th day of August 1974.

(SEAL)
Attest:

McCOY M. GIBSON, JR.
Attesting Officer

C. MARSHALL DANN
Commissioner of Patents